United States Patent [19]

Tanaka et al.

[11] Patent Number: 4,782,417

[45] Date of Patent: Nov. 1, 1988

[54] DISC CARTRIDGE

[75] Inventors: Kimio Tanaka; Haruo Shiba, both of Nagano, Japan

[73] Assignee: TDK Corporation, Japan

[21] Appl. No.: 942,494

[22] Filed: Dec. 16, 1986

[30] Foreign Application Priority Data

Dec. 18, 1985 [JP] Japan .......................... 60-194557[U]

[51] Int. Cl.$^4$ ............................................. G11B 23/03
[52] U.S. Cl. .................................................... 360/133
[58] Field of Search ................ 360/133; 369/272, 291; 206/444

[56] References Cited

U.S. PATENT DOCUMENTS 4,620,247 10/1986 Papciak .......................... 360/133 X
4,665,457 5/1987 Odawara .............................. 360/133

Primary Examiner—A. J. Heinz
Attorney, Agent, or Firm—Steinberg & Raskin

[57] ABSTRACT

A disc cartridge capable of effectively preventing a recording surface section of a disc from being directly contacted by an inner surface of a casing. The disc cartridge includes a casing having a space defined therein. An inner surface of the casing has a rear end surface section which is positioned opposite to an insertion side of the disc cartridge and against which a peripheral portion of the disc is abutted. The rear end surface section is formed into a substantially sideways V-shape so that the disc may be positioned at substantially a center of the casing in a width direction of the casing along the rear end surface section.

10 Claims, 2 Drawing Sheets

DISC CARTRIDGE

FIELD OF THE INVENTION

This invention relates to a disc cartridge, and more particularly to a disc cartridge which has a hard disc, particularly, a double-sided type hard disc housed in a casing.

BACKGROUND OF THE INVENTION

In general, a disc-type data recording carrier such as a compact disc (CD), a video disc (LD) or the like is used in a manner to be removed from a packing case and set in a recording and/or reproducing equipment.

Conventionally, it has been desirable to protect such a disc type recording carrier from the environment because it is not only easy to be covered with dust and damaged but adversely affected due to a variation in temperature. For this purpose, the use of an envelope such as a tray, a casing or the like has been proposed to protect the disc. Unfortunately, such a conventional envelope is not suitable for the protection of a double-sided hard disc, because the the housing of the disc in a storage space defined in the envelope causes the disc to be contacted by the envelope. Also, the envelope causes the disc to be contacted by an inner surface thereof during the storage or transportation. Thus, the use of the envelope results in damage and/or pollution of the disc as well as the exposure of the disc to a variation in temperature. Further, the conventional envelope has a further disadvantage of rendering handling of a disc cartridge troublesome.

Accordingly, it would be highly desirable to provide a disc cartridge which is capable of preventing a recording surface section of a disc from being contacted by a casing to ensure the safe housing of the disc in the casing.

SUMMARY OF THE INVENTION

Briefly speaking, in accordance with the present invention, a disc cartridge is provided. The disc cartridge includes a casing comprising an upper cover plate and a lower cover plate joined together to define a space therein, in which a disc is rotatably housed. An inner surface of the casing has a peripheral surface section which is opposite to an insertion side of the disc cartridge and against which the disc is abutted. At least a part of the peripheral surface section comprises a slanting surface shape section formed so as to slant toward a center of the peripheral surface section in a width direction thereof. In a preferred embodiment, the slanting surface shape section comprises a V-shaped rear end surface section.

Accordingly, it is an object of the present invention to provide a disc cartridge which is capable of constantly keeping a disc at a safe state in a casing.

It is another object of the present invention to provide a disc cartridge which is capable of effectively preventing a recording surface section of a disc from being contacted directly by a casing.

It is a further object of the present invention to provide a disc cartridge which is capable of safely housing a disc in a casing without damaging the disc.

It is still another object of the present invention to provide a disc cartridge which is capable of preventing the unsteadiness of a disc in a casing.

It is yet another object of the present invention to provide a disc cartridge which is capable of being manufactured at a low cost.

Still other objects and advantages of the invention will be apparent from the specification.

The invention accordingly comprises the features of construction, combination of elements, and arrangement of parts which will be exemplified in the construction hereinafter set forth.

BRIEF DESCRIPTION OF THE DRAWINGS

For a fuller understanding of the invention, reference is made to the following description taken in connection with the accompanying drawings in which like reference numerals designate like or corresponding parts throughout; wherein.

DETAILED DESCRIPTION OF THE PREFERRED EMBODIMENT

Now, a disc cartridge according to the present invention will be described hereinafter with reference to the accompanying drawings.

Figure 1:
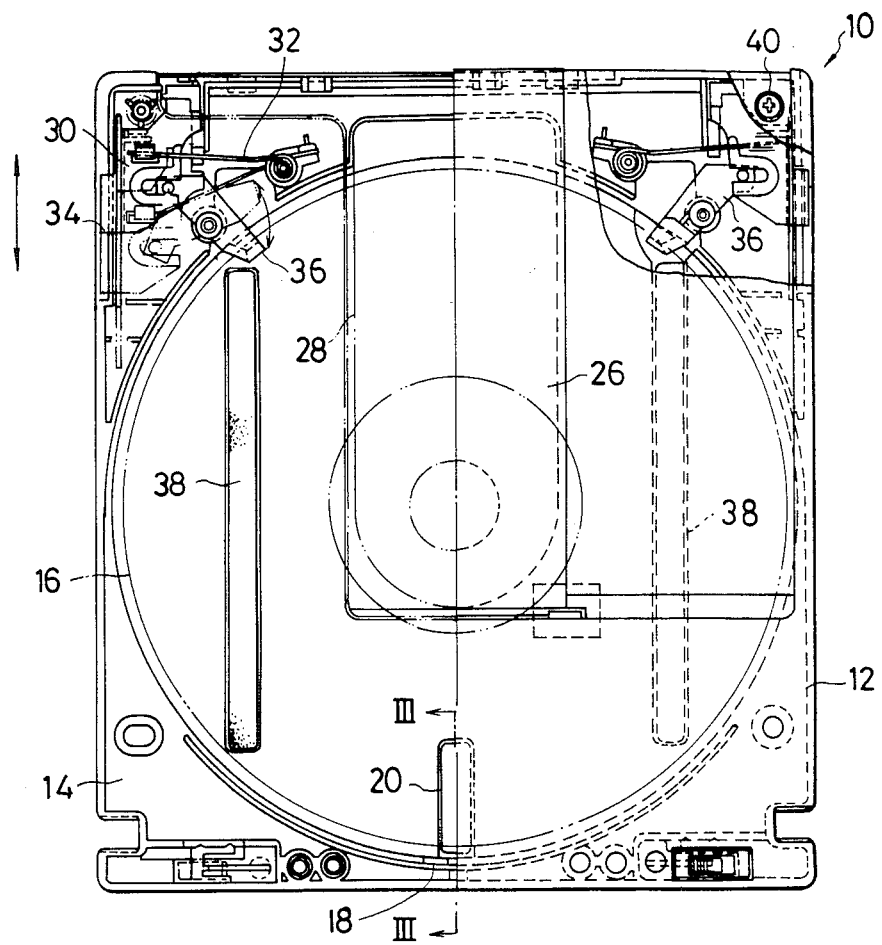
FIG. 1 is a partly cutaway plan view showing an embodiment of a disc cartridge according to the present invention.

FIG. 1 shows an embodiment of a disc cartridge according to the present invention.

Figure 2:
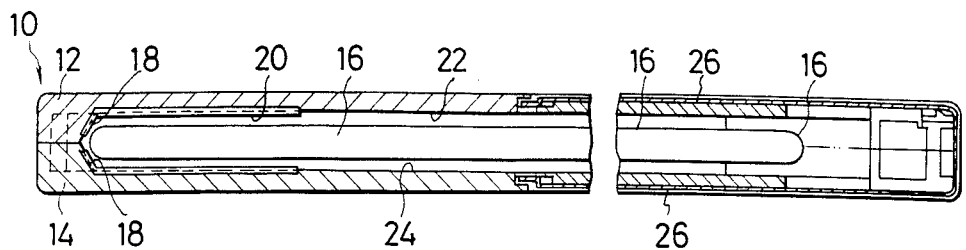
FIG. 2 is a partly cutaway vertical sectional view of the disc cartridge shown in FIG. 1.
Figure 3:
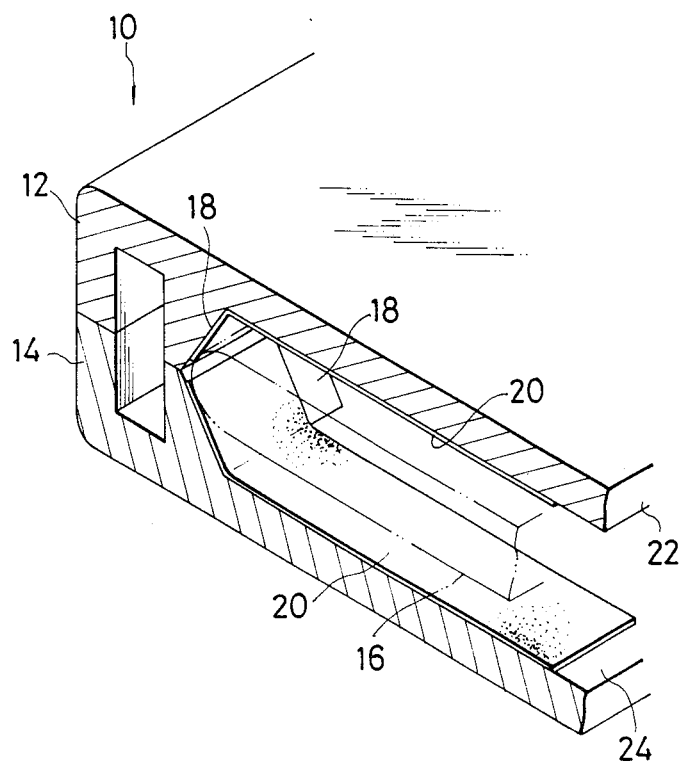
FIG. 3 is a perspective sectional view taken along line III—III of FIG. 1.

A disc cartridge of the illustrated embodiment includes a casing 10 comprising an upper cover plate 12 and a lower cover plate 14 joined together so as to define a space therein, and a disc 16 received or housed in the casing 10. An inner surface of the casing 10 has a peripheral surface section thereof of which at least a part is formed into a slanting surface shape so as to slant toward a center of the peripheral surface section in a width direction thereof, as indicated by reference numeral 18 in FIGS. 2 and 3. Such a peripheral surface section corresponds to that which is opposite to an insertion side of the disc cartridge and against which a peripheral portion of the disc is abutted. In the illustrated embodiment, this is a rear end surface of the interior of the casing, and the whole rear end surface section is formed into a substantially sideways V-shape so that it may be tapered in section. Onto the V-shaped rear end surface section 18 is applied a lubricating disc holding member 20. Such a disc holding member may be applied to at least portions of upper and inner surface sections adjacent to the V-shaped rear end surface section 18 as shown in FIGS. 2 and 3.

In the illustrated embodiment, the slanting surface shape section 18 comprises the V-shaped rear end surface section, which is formed to have an apex positioned at substantially a center of the end surface in the width direction of the end surface to guide the disc so that it may be positioned at a center of the casing in the width direction of the casing. The disc holding member 20 is formed into a sheet-like shape and may be made of, for example, ultra-high-molecular-weight polyethylene, ultra-high-molecular-weight polyethylene foam, graphite teflon polyester (PET), a metal material exhibiting low friction and wear resistance such as stainless steel or the like.

In the illustrated embodiment, the V-shaped rear end surface section 18 is constituted by a part of the casing itself. However, it may be formed of a rib. Also, in the illustrated embodiment, the slanting surface shape section 18 comprises the whole V-shaped rear end surface section. However, it is not limited to such a V-shaped surface. The slanting surface section 18 may be formed in a manner to be somewhat curved.

Thus, it will be noted that the slanting surface section 18 may be formed into any suitable shape so long as it can guide the peripheral portion of the disc abutted against it so that the disc may be positioned at substantially the center of the casing in the width direction of the casing. Also, the slanting surface shape section 18 may be formed into a continuous or discontinuous ring-like shape. Alternatively, a plurality of such slanting surface sections are arranged for example, in a manner to be symmetrical with or spaced from one another.

In FIG. 1, reference numeral 26 designates a shutter which is actuated to operate at least a window 28 for inserting a disc driving mechanism of a disc player (not shown) therethrough into the disc cartridge. The shutter 26 is operatively connected to or engaged with a pair of actuators 30, each of which is forced toward a front end of the casing by means of a spring 32. The actuator 30 includes an actuating means 34 slidably arranged and outwardly projected from the casing 10. Each of the actuators 30 is operatively connected to a disc receiver adapted to selectively support the disc. The disc receiver 36 is pivotally arranged so as to hold the disc at a state of floating in the space of the casing 10. Reference numeral 38 designates lubricating sheet members on which the disc selectively are put and 40 designates screws.

In the disc cartridge of the illustrated embodiment constructed as described above, the disc 16 is kept at a state of floating in the space of the casing by means of a disc driving mechanism of a disc player during a period of time for which it is driven. When the disc cartridge is to be removed from the player, the disc 16 is held on the disc holding members 20 to prevent a recording surface section from being directly contacted with the inner surface of the casing 10 during transfer of the disc from the disc driving mechanism to the disc receiver 36.

As can be seen from the foregoing, the disc cartridge of the present invention is so constructed that the inner surface of the casing has the peripheral surface section thereof of which at least a part is formed into slanting surface shape so that the part may slant toward the center of the peripheral surface section in the width direction thereof. Accordingly, the disc is held through its nonrecording surface section with respect to the casing, so that damage and pollution of the disc may be substantially prevented. Also, the slanting surface shape section has the lubricating disc holding member 20 applied thereto, so that the disc may be readily guided to the slanting surface shape section.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

What is claimed is:

1. A disc cartridge comprising:
    a casing comprising an upper cover plate and a lower cover plate joined together to define a space therebetween; and
    a disc rotatably housed in said space of said casing;
    said casing having an inner surface which has a peripheral surface section which is opposite to an insertion side of said disc cartridge and against which said disc abuts, at least a part of said peripheral surface section comprising a slanting surface shape section formed so as to slant toward a center of said peripheral surface section in a width direction thereof between said cover plates wherein said slanting surface shape section has a lubricating disc holding member applied thereto.

2. A disc cartridge as defined in claim 1, said slanting surface shape section comprises a substantially V-shaped rear end surface section.

3. The cartridge of claim 2, wherein an apex of said substantially V-shaped rear end surface section is positioned at substantially the center of said peripheral surface section in the width direction thereof, so that the disc may be guided and positioned at a center of said casing in the width direction thereof, without generating unsteadiness of the disc.

4. A disc cartridge as defined in claim 1, wherein said disc holding member is formed of a material selected from the group consisting of ultra-high-molecular-weight polyethylene, ultra-high-molecular-weight polyethylene foam, graphite teflon polyester (PET), and a metal material exhibiting low friction and wear resistance.

5. A disc cartridge as defined in claim 4, wherein said disc holding member is formed into a sheet-like shape.

6. A disc cartridge as defined in claim 5, wherein said disc holding member is applied to at least a portion of each of an upper inner surface section and a lower inner surface section adjacent to said slanting surface shape section.

7. The cartridge of claim 1, wherein said peripheral surface section is curved over a direction substantially perpendicular to said width direction.

8. The cartridge of claim 1, wherein said slanting surface shape section is formed and positioned to guide said disc and position the same at a center of said casing in the width direction, without generating unsteadiness of the disc.

9. The cartridge of claim 1, wherein said peripheral surface section extends between said cover plates over said width direction thereof.

10. The cartridge of claim 1, wherein said cover plates are fixedly joined to one another, to retain said disc in said space at all times.

* * * * *